UNITED STATES PATENT OFFICE.

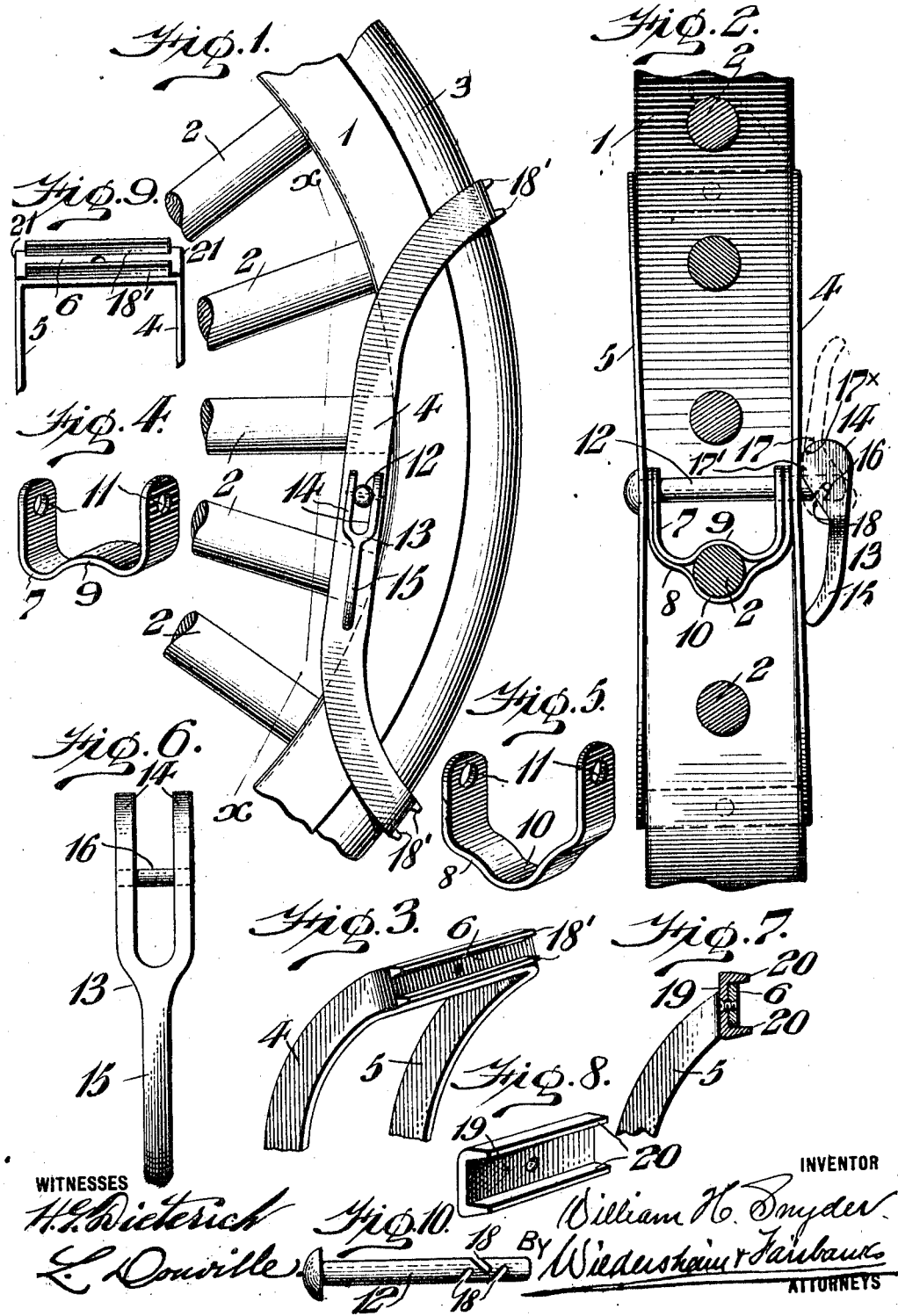

WILLIAM H. SNYDER, OF ASHBOURNE, PENNSYLVANIA.

ANTI SLIPPING AND SKIDDING DEVICE.

1,004,487.  Specification of Letters Patent.  Patented Sept. 26, 1911.

Application filed March 9, 1911. Serial No. 613,381.

*To all whom it may concern:*

Be it known that I, WILLIAM H. SNYDER, a citizen of the United States, residing in the city of Ashbourne, county of Montgomery, State of Pennsylvania, have invented a new and useful Anti Slipping and Skidding Device, of which the following is a specification.

My invention relates to a new and useful device for tires on automobiles and other vehicles, to prevent the same from slipping and from skidding and it is suitably attached to the wheel in order to prevent the same from relative movement with respect to the anti-skidding device and it consists in providing a plurality of tread members carried by side members adapted to seat on opposite sides of the rim of the wheel with means for connecting the same to the spokes of the wheel.

It further consists of other novel features of construction, all as will be hereinafter fully set forth.

Figure 1 represents a side elevation of a portion of the vehicle wheel, showing one of the anti-skidding devices in position. Fig. 2 represents a sectional view on line *x—x* Fig. 1. Fig. 3 represents a perspective view of one end of the anti-skidding device, showing one of the tread members. Figs. 4 and 5 represent perspective views of the clips employed. Fig. 6 represents an end elevation of the locking device employed. Fig. 7 represents a sectional view of one of the tread members showing a plate connected therewith. Fig. 8 represents a perspective view of the plate in detached position. Fig. 9 represents an elevation of one end of a device showing a sharp angle between the tread member and the side members. Fig. 10 represents a form of bolt which may be employed.

Similar numerals of reference indicate corresponding parts in the figures.

It has been found in practice that it is extremely troublesome to connect the anti-skidding devices, now in use, with a vehicle wheel and in some instances the wheel will rotate without carrying with it the anti-skidding device. My invention is designed to overcome these defects and in the drawing I have shown one embodiment thereof which will operate successfully in practice but it will be evident that the arrangement of the parts may be varied, other instrumentalities may be employed, and changes made in the construction which will come within the scope of my invention and I do not therefore desire to be limited in every instance to the exact construction, as herein shown and described, but desire to make such changes as may be necessary.

1 designates a portion of the rim or felly of the vehicle wheel having spokes 2 connected therewith and being provided with a tire 3 of any suitable construction. As seen from Fig. 1, my anti-skidding device consists of side members or bars 4 and 5 which are suitably curved, as best understood from Fig. 1, and the ends of said bars being connected by tread members 6 which are of suitable length in order that the distance between the side arms 4 and 5 is sufficient to permit the same to be slipped over the tire 3 and rim 1 of the vehicle wheel and to suitably embrace the latter, a portion of the side members 4 and 5 embracing a suitable portion of the rim 1 of the wheel, and the central portion of the side members or arms 4 and 5 extending inwardly beyond the inner plane of the rim 1, it being seen and understood that as the wheel rotates the tread members 6 will contact with the ground, as will be evident. I desire to provide as many of the devices around the wheel as may be necessary or desirable and each of these devices are independently secured to the vehicle wheel. In order to prevent the wheel from rotating or moving without carrying around the devices, I have provided a clip which is adapted to be connected with the spoke of the vehicle wheel and also to the side members 4 and 5 of the anti-skidding devices. The clip in the present instance is shown as consisting of two members 7 and 8 provided with curved seats 9 and 10, for the reception of a spoke 2 and said members having extending arms as best understood from Fig. 2, which, adjacent their ends, are provided with openings 11.

12 designates a suitable bolt which is adapted to pass through suitable openings in the side members 4 and 5 and also the openings 11 in the clips 7 and 8 in order that the parts will be suitably locked together and will be locked with respect to the spoke 2, which is embraced by the clip. In order to firmly hold the bolt in position I provide a locking member 13 which has a yoke 14 and a handle or operating member 15 and said yoke, or the arms thereof, is also provided with cam faces 17.

16 designates a pin extending between the arms forming the yoke 14 and which is adapted to enter and engage the walls of one of the slots 18 formed adjacent one end of the bolt 12 it being seen that the locking member 13 is placed in the position shown by dotted lines, Fig. 2 and by rotating the same into the position seen in full lines therein, the cam faces 17 on the yoke 14 abut against one of the side members of the anti-skidding device to draw the bolt tightly into position to lock the parts with respect to each other. By this means in order to remove or replace the anti-skidding device it is only necessary to release engagement of the cams 17 by proper rotation of the member 13 after which the bolt 12 can be removed from the openings and the anti-skidding device and clips can be removed, quickly and easily, without the use of any tools.

I preferably desire to provide the tread member 6 with the projecting lugs or ears 18' to assist in forming a gripping surface for the members. I may also provide a plate 19 having ears or lugs 20 thereon which plate can be connected with the tread member 6, as best seen in Fig. 7, in any suitable manner should it be found more desirable to have the lugs or ears for the tread member independent thereof or should the lugs or ears 18' wear down.

In Fig. 9 I have shown the sharp angle 21 formed between the side members and the tread member which would tend to assist in preventing skidding as will be evident. It will be of course understood that the space between the side members and consequently the length of the tread members may be varied to accommodate various width wheels and the shape of the tread members may be varied to accommodate various shaped and size tires.

It will be noted that when the locking device is in its locking position as seen in Fig. 2 that the largest portion of the cam face has passed the engagement with the side member 4, that is to say, the distance between pin 16 and the point 17' of the cam face is less than that between the pin 16 and the point 17ˣ, so that while the parts will be firmly held in position, the locking member 13 will itself be locked against accidental displacement.

It will be noted that by reason of the rigid engagement of the skidding device with the proper spokes of the wheel and because the skidding device is itself formed of a rigid frame, no movement between the wheel and the skidding device is possible, thus preventing damage to the wheel or tire.

Having thus described my invention what I claim as new and desire to secure by Letters Patent, is:—

1. An anti-skidding device for vehicle wheels, comprising side bars adapted to seat on opposite sides of and embrace a suitable portion of a wheel rim and curved inwardly beyond the same, tread members carried by said side members and adapted to be situated at the tread portion of the tire, clips adapted to embrace a spoke of the vehicle wheel and securing means adapted both to connect said clips and said side members whereby the same securing means serves to lock both said tread members and said clips with respect to the wheel.

2. An anti-skidding device for vehicle wheels, comprising side members adapted to seat on opposite sides of and embrace a suitable portion of a wheel rim and curved inwardly thereof, tread members carried by said side members and adapted to be situated at the tread portion of the tire, a clip formed of two members adapted to seat on opposite sides of a spoke of the wheel, a bolt passing through said side members and said clips, and means for locking said bolt in position, whereby the parts are firmly locked together and to the vehicle wheel.

3. An anti-skidding device for vehicle wheels, comprising side members adapted to seat on opposite sides of and embrace a suitable portion of a wheel rim and curved inwardly thereof, tread members carried by said side members and adapted to be situated at the tread portion of the tire, a clip formed of two members adapted to seat on opposite sides of a spoke of the wheel, a bolt passing through said side members and said clips, and a cam member connected with said bolt and adapted to be actuated in locking and unlocking the same.

WILLIAM H. SNYDER.

Witnesses:
C. D. McVay,
N. Bussinger.